(12) United States Patent
Vos et al.

(10) Patent No.: US 7,995,735 B2
(45) Date of Patent: Aug. 9, 2011

(54) METHOD AND APPARATUS FOR MANAGING CUSTOMER DATA

(76) Inventors: Chad Vos, Erie, CO (US); Deborah Thompson, Denver, CO (US); Josh Larrabee, Denver, CO (US)

(*) Notice: Subject to any disclaimer, the term of this patent is extended or adjusted under 35 U.S.C. 154(b) by 1444 days.

(21) Appl. No.: 10/825,645

(22) Filed: Apr. 15, 2004

(65) Prior Publication Data

US 2005/0232399 A1   Oct. 20, 2005

(51) Int. Cl.
*H04M 3/42* (2006.01)

(52) U.S. Cl. .............. 379/218.01; 379/221.08; 704/275; 705/8; 709/200; 709/223

(58) Field of Classification Search ............. 379/218.01, 379/265.12, 265.13, 266.02, 266.07, 221.08; 709/200, 223; 704/275; 705/8
See application file for complete search history.

(56) References Cited

U.S. PATENT DOCUMENTS

| | | |
|---|---|---|
| 3,829,088 A | 8/1974 | Pahlas |
| 4,451,985 A | 6/1984 | Pullman |
| D276,626 S | 12/1984 | Lockwood |
| 4,567,359 A | 1/1986 | Lockwood |
| RE32,115 E | 4/1986 | Lockwood et al. |
| D286,956 S | 12/1986 | Lockwood |
| 4,793,810 A | 12/1988 | Beasley, Jr. |
| 5,002,491 A | 3/1991 | Abrahamson et al. |
| 5,059,127 A | 10/1991 | Lewis et al. |
| 5,204,813 A | 4/1993 | Samph et al. |
| 5,208,869 A | 5/1993 | Holt |
| 5,211,563 A | 5/1993 | Haga et al. |
| 5,251,268 A | 10/1993 | Colley et al. |
| 5,261,823 A | 11/1993 | Kurokawa |
| 5,267,865 A | 12/1993 | Lee et al. |
| 5,294,229 A | 3/1994 | Hartzell et al. |
| 5,302,132 A | 4/1994 | Corder |
| 5,309,355 A | 5/1994 | Lockwood |
| 5,310,349 A | 5/1994 | Daniels et al. |
| 5,337,141 A | 8/1994 | Egli et al. |
| 5,397,865 A | 3/1995 | Park |

(Continued)

FOREIGN PATENT DOCUMENTS

CA  2344639  2/2001

(Continued)

OTHER PUBLICATIONS

A+dvantage—Worldware, 1995, Jostens Learning Brochure.

(Continued)

*Primary Examiner* — Simon Sing
*Assistant Examiner* — Simon King
(74) *Attorney, Agent, or Firm* — William S. Morriss; Frost Brown Todd LLC

(57) ABSTRACT

Embodiments of the technology disclosed herein provides an overall, or holistic view, of an enterprise's interaction with its customers. These embodiments can also provide a holistic view of other types of interactions. In one particular embodiment, a system collects and aggregates information related to user inquiries and/or response generated by different types of response systems. Such an embodiment could collect data about phone response system activities and aggregate that information with data about automated response system activities. Other embodiments collect and aggregate information related to customer information, contact resolutions and other information. Other embodiments of the disclosed technology generate reports based on aggregated information and/or generate recommendations to address problems with the individual response systems or the overall strategy for responding to customer inquiries.

18 Claims, 7 Drawing Sheets

U.S. PATENT DOCUMENTS

| | | | |
|---|---|---|---|
| 5,441,415 A | 8/1995 | Lee et al. | |
| 5,444,774 A | 8/1995 | Friedes | |
| 5,458,494 A | 10/1995 | Krohn et al. | |
| 5,513,991 A | 5/1996 | Reynolds et al. | |
| 5,513,994 A | 5/1996 | Kershaw et al. | |
| 5,570,419 A | 10/1996 | Cave et al. | |
| 5,576,951 A | 11/1996 | Lockwood | |
| 5,594,791 A | 1/1997 | Szlam et al. | |
| 5,630,025 A | 5/1997 | Dolby et al. | |
| 5,636,036 A | 6/1997 | Ashbey | |
| 5,708,798 A | 1/1998 | Lynch et al. | |
| 5,710,887 A | 1/1998 | Chelliah et al. | |
| 5,721,845 A | 2/1998 | James et al. | |
| 5,727,950 A | 3/1998 | Cook et al. | |
| 5,743,746 A | 4/1998 | Ho et al. | |
| 5,745,765 A | 4/1998 | Paseman | |
| 5,781,914 A | 7/1998 | Stork et al. | |
| 5,788,504 A | 8/1998 | Rice et al. | |
| 5,788,508 A | 8/1998 | Lee et al. | |
| 5,825,651 A | 10/1998 | Gupta et al. | |
| 5,827,070 A | 10/1998 | Kershaw et al. | |
| 5,844,554 A | 12/1998 | Geller et al. | |
| 5,877,966 A | 3/1999 | Morris et al. | |
| 5,904,485 A | 5/1999 | Siefert | |
| 5,907,706 A | 5/1999 | Brodsky et al. | |
| 5,909,589 A | 6/1999 | Parker et al. | |
| 5,918,217 A | 6/1999 | Maggioncalda et al. | |
| 5,920,848 A | 7/1999 | Schutzer et al. | |
| 5,947,747 A | 9/1999 | Walker et al. | |
| 5,956,709 A | 9/1999 | Xue | |
| 5,963,953 A | 10/1999 | Cram et al. | |
| 5,974,446 A | 10/1999 | Sonnenreich et al. | |
| 5,978,648 A | 11/1999 | George et al. | |
| 6,002,854 A | 12/1999 | Lynch et al. | |
| 6,012,051 A | 1/2000 | Sammon, Jr. et al. | |
| 6,032,129 A | 2/2000 | Greef et al. | |
| 6,035,283 A | 3/2000 | Rofrano | |
| 6,055,569 A | 4/2000 | O'Brien et al. | |
| 6,070,142 A | 5/2000 | McDonough et al. | |
| 6,091,930 A | 7/2000 | Mortimer et al. | |
| 6,167,255 A * | 12/2000 | Kennedy et al. | 455/414.1 |
| 6,178,239 B1 * | 1/2001 | Kishinsky et al. | 379/266.07 |
| 6,201,948 B1 | 3/2001 | Cook et al. | |
| 6,237,035 B1 | 5/2001 | Himmel et al. | |
| 6,246,752 B1 * | 6/2001 | Bscheider et al. | 379/88.22 |
| 6,321,209 B1 | 11/2001 | Pasquali | |
| 6,343,329 B1 | 1/2002 | Landgraf et al. | |
| 6,356,284 B1 | 3/2002 | Manduley et al. | |
| 6,381,325 B1 * | 4/2002 | Hanson | 379/218.01 |
| 6,427,063 B1 | 7/2002 | Cook et al. | |
| 6,658,432 B1 * | 12/2003 | Alavi et al. | 707/104.1 |
| 6,754,486 B2 * | 6/2004 | Cox et al. | 455/414.1 |
| 6,760,727 B1 | 7/2004 | Schroeder et al. | |
| 6,810,111 B1 | 10/2004 | Hunter et al. | |
| 6,829,348 B1 | 12/2004 | Schroeder et al. | |
| 6,928,156 B2 * | 8/2005 | Book et al. | 379/265.01 |
| 6,959,078 B1 * | 10/2005 | Eilbacher et al. | 379/265.03 |
| 6,959,080 B2 * | 10/2005 | Dezonno et al. | 379/265.07 |
| 7,003,079 B1 * | 2/2006 | McCarthy et al. | 379/32.01 |
| 7,027,586 B2 * | 4/2006 | Bushey et al. | 379/265.09 |
| 7,069,271 B1 * | 6/2006 | Fadel et al. | 707/102 |
| 7,382,773 B2 | 6/2008 | Schoeneberger et al. | |
| 7,568,001 B2 | 7/2009 | McPartlan et al. | |
| 2001/0032140 A1 | 10/2001 | Hoffman | |
| 2002/0083067 A1 * | 6/2002 | Tamayo et al. | 707/100 |
| 2002/0106070 A1 * | 8/2002 | Elsey et al. | 379/218.01 |
| 2003/0179876 A1 * | 9/2003 | Fox et al. | 379/265.02 |
| 2004/0088167 A1 * | 5/2004 | Sartini | 704/270.1 |
| 2004/0190707 A1 * | 9/2004 | Ljubicich | 379/218.01 |
| 2004/0264670 A1 * | 12/2004 | Flores et al. | 379/220.01 |
| 2006/0062376 A1 * | 3/2006 | Pickford | 379/265.12 |
| 2008/0095355 A1 * | 4/2008 | Mahalaha et al. | 379/265.09 |
| 2009/0163183 A1 * | 6/2009 | O'Donoghue et al. | 455/414.1 |

FOREIGN PATENT DOCUMENTS

| | | |
|---|---|---|
| EP | 0 496 492 A1 | 7/1992 |
| EP | 0 496 492 B1 | 9/1995 |
| EP | 0 829 996 A2 | 3/1998 |
| WO | WO 97/44767 | 11/1997 |
| WO | WO 98/32107 | 7/1998 |
| WO | WO 99/01826 | 1/1999 |
| WO | WO 00/29977 | 5/2000 |
| WO | PCT/US00/20185 | 7/2000 |
| WO | WO 01/09745 | 2/2001 |

OTHER PUBLICATIONS

Applied Physics, 1995, EduStar America Inc. Brochure.
Aqua Venture, 1995, EduStar America Inc. Brochure.
Barron, 1994, Authoring-Systems Software for Computer-Based Training (Educational Technology Publications, New Jersey) pp. 75-92.
Basic Electronics, 1995, Degem Systems Brochure.
Best, 1995, Degem Systems Brochure.
Brader, 1994, Authoring-Systems Software for Computer-Based Training (Educational Technology Publications, New Jersey) pp. 45-60.
Burke, 1994, Authoring-Systems Software for Computer-Based Training (Educational Technology Publications, New Jersey) pp. 123-141.
Carbonell, 1970, IEEE Transactions on Man-Machine Systems 11:190-203.
Cook, 1989, A Briefing for Buyers (Asymtote Inc., Boston).
Educating Jessica's Generation, 1995, Jostens Learning Brochure.
EduStar Mathematics, 1995, Innovative Technologies in Education Brochure.
Fall, III, 1994, Authoring-Systems Software for Computer-Based Training (Educational Technology Publications, New Jersey) pp. 143-164.
Guttman et al., 1998, "Agent-mediated electronic commerce: a survey," *The Knowledge Engineering Review* 13(2):147-159.
Hello Blue Planet, 1995, EduStar America Inc. Brochure.
Hibbard, Justin, (Apr. 12, 1999), Assembly Online: The Web is changing mass production into mass customization, Information Week Online: News and Reviews (Online) Available Web Site: www.informationweek.com/729/build.htm; Accessed on: Oct. 30, 2001.
Home Reach, 1995, Computer Curriculum Corporation Brochure.
Keller, 1968, j. Applied Behavior Analysis 1:79-89.
Kimball, 1995, Educational Leadership 53:54-56.
Kulik et al., 1983, J. Educational Psychology 75:19-26.
Kulik et al., 1986, J. Educational Computing Research 2:235-252.
Lamb, 1994, Authoring-Systems Software for Computer-Based Training (Educational Technology Publications, New Jersey) pp. 24-44.
Learning First—New Edition, 1995, Jostens Learning Brochure.
Lesser, 1995, ACM Computing Surveys 27:340-342.
Lindsley, 1990, Teaching Exceptional Children 22:353-359.
Maes, 1994, Communications of the ACM 37:31-40.
Meet Lightspan, 1996, Lightspan Brochure.
O'Keefe and McEachern, 1998, "Web-based Customer Decision Support Systems," *Communications of the ACM* 41(3)71-78.
Osin, 1984, Proc. 4$^{th}$ Jerusalem Conf. on Information Technology, pp. 418-424.
Pasik, Alexander J. (Sep. 24, 1998), The Software Investor, *The Configuration Invasion*.
Peha, 1995, Educational Leadership 53:18-25.
Plato Learning System, 1995, TRO Learning, Inc. Brochure.
SageTalk: *Designing a Tool for Designing Successful Web-based Social Agents* (Paper ID 254); Conference '00, Month 1-2, 2000.
Sherry and Komoski, eds., 1990, The IIS Report pp. 3-6, 21-24, 52, 256-260.
Vaas, Lisa (May 17, 1999), *Service Sites Buckle Up Configurators*, PCWeek Online (Online) Available Web Site: www.zdnet.com/pcweek/stories/news/0,4153,402639,00.html; Accessed on: Oct. 30, 2001.
Venezky and Osin, 1991, The Intelligent Design of Computer-Assisted Instruction (Longman, New York) chapters 3 and 7-13.
Writing Expedition, 1994, Ideal Learning Brochure.
Poleretzky Z et al: "The Call Center & e-Commerce Convergence" Dialog ABI/lnform(R), XP002949410 2001.

Attardi G et al: "Web-based Configuration Assistants" Artificial Intelligence for Engineering Design, Analysis and Manufacturing, London, GB, vol. 12, No. 4, Sep. 1998 pp. 321-331, XP002902516.
"Arithmetic", Basic Education Software Tool (BEST), Degem Systems.
Office Action dated May 14, 2009 for U.S. Appl. No. 11/291,562.
Office Action dated Jul. 9, 2009 for U.S. Appl. No. 11/686,812.
Office Action dated Nov. 29, 2010 for U.S. Appl. No. 11/208,028.
Office Action dated Jan. 13, 2010 for U.S. Appl. No. 11/686,812.
Information Disclosure Statement for U.S. Appl. No. 11/291,562, filed Oct. 15, 2007.
Information Disclosure Statement for U.S. Appl. No. 11/291,562, filed Feb. 8, 2006.
Original Application for U.S. Appl. No. 11/291,562, filed Dec. 1, 2005.
Office Action Non-Final Rejection for U.S. Appl. No. 09/559,837, filed Feb. 27, 2004.
Information Disclosure Statement for U.S. Appl. No. 09/559,837, filed Jun. 30, 2000.
Original Application for U.S. Appl. No. 09/559,837, filed Apr. 26, 2000.
Information Disclosure Statement for U.S. Appl. No. 09/467,378, filed May 20, 2003.
Information Disclosure Statement for U.S. Appl. No. 09/467,378, filed May 31, 2000.
Original Application for U.S. Appl. No. 09/467,378, filed Dec. 28, 1999.
Information Disclosure Statement for U.S. Appl. No. 11/686,812, filed Nov. 13, 2007.
Original Application for U.S. Appl. No. 11/686,812, filed Mar. 15, 2007.
Original Application for U.S. Appl. No. 60/146,515, filed Aug. 4, 1999.
Notice of References Cites for U.S. Appl. No. 09/632,948, filed Mar. 26, 2004.
Office Action Restriction of Claims for U.S. Appl. No. 09/632,948, filed Feb. 24, 2004.
Information Disclosure Statement for U.S. Appl. No. 09/632,948, filed Dec. 4, 2003.
Original Application for U.S. Appl. No. 09/632,948, filed Aug. 4, 2000.
U.S. Appl. No. 11/291,562.
U.S. Appl. No. 11/686,812.
U.S. Appl. No. 09/632,948.
U.S. Appl. No. 60/146,515.
Office Action dated Nov. 26, 2008 for U.S. Appl. No 10/923,442.
U.S. Appl. No. 11/207,609, filed Aug. 19, 2005, Carter et al.
U.S. Appl. No. 11/208,028, filed Aug. 19, 2005, Potter, III et al.
U.S. Appl. No. 11/208,041, filed Aug. 19, 2005, Potter, III et al.
Office Action dated May 22, 2007 for U.S. Appl. No. 11/207,609.
Office Action dated Oct. 17, 2007 for U.S. Appl. No. 11/207,609.
Office Action dated Feb. 19, 2009 for U.S. Appl. No. 11/207,609.
Office Action dated Jul. 21, 2009 for U.S. Appl. No. 11/207,609.
Office Action dated Mar. 21, 2009 for U.S. Appl. No. 11/207,609.
Office Action dated Jan. 30, 2009 for U.S. Appl. No. 11/208,028.
Office Action dated Jun. 23, 2009 for U.S. Appl. No. 11/208,028.
Office Action dated Oct. 26, 2009 for U.S. Appl. No. 11/208,028.
Office Action dated Mar. 15, 2009 for U.S. Appl. No. 11/208,028.
Office Action dated Aug. 3, 2010 for U.S. Appl. No. 11/208,028.
Office Action dated May 2, 2007 for U.S. Appl. No. 11/208,041.
Office Action dated Oct. 17, 2007 for U.S. Appl. No. 11/208,041.
Office Action dated Jun. 2, 2008 for U.S. Appl. No. 11/208,041.
Office Action dated Nov. 13, 2008 for U.S. Appl. No. 11/208,041.

* cited by examiner

METHOD AND APPARATUS FOR MANAGING CUSTOMER DATA

FIELD OF THE INVENTION

The present invention relates to systems and methods for managing data. In particular, but not by way of limitation, the present invention relates to systems and methods for categorizing, collecting and/or analyzing customer service data.

BACKGROUND OF THE INVENTION

Customer service often requires quick, consistent responses to customer inquiries. In the not so distant past, live service agents responded to most customer inquires by phone. Phone responses are extremely expensive, and with the spread of the internet, live agents began to respond to customer inquiries by cheaper methods such as email and chat programs.

Live agents, whether responding by phone, email or chat program, remain important for many businesses. Companies seeking to further reduce their costs, however, replaced or supplemented live agents with automated systems such as virtual agents and interactive voice response (IVR) systems. Automated systems respond to routine customer inquiries based on a decision tree and/or active logic. These systems are often referred to as "response systems."

All of these different response systems generally generate some performance metrics by which they can be evaluated. For example, a phone response system can report the number of calls received, average number of minutes required to respond to each call, number of calls abandoned before being reached, etc. Other response systems generally report similar metrics.

Different response systems are generally not integrated, and the different reporting metrics are integrated poorly, if at all. A customer with an email response system, a voice response system, and an automated agent could receive three different sets of metrics and may have no way to evaluate the combined performance of all three systems. Further, these disparate response systems do not enable a consistent response strategy for addressing user inquiries. A phone operator, for example, could generate a different response to a particular inquiry than would an automated system. Such response inconsistencies make integrating metrics from different response systems difficult.

Although present response systems are functional, they are not satisfactory. A system and method are needed to address the shortfalls of present technology and to provide other new and innovative features. For example, systems and methods are needed to better provide an overall, or holistic view, of a company's interaction with its customers. Similarly, a system and method are needed to provide a consistent response strategy across all types of response systems.

SUMMARY OF THE INVENTION

One embodiment of the technology disclosed herein provides an overall, or holistic view, of an enterprise's interaction with its customers. These embodiments can also provide a holistic view of other types of interactions. In one particular embodiment, a system collects and aggregates information related to user inquiries and/or responses generated by different types of response systems. Such an embodiment could collect data about phone response system activities and aggregate that information with data about an automated response system activities. Other embodiments collect and aggregate information related to customer information, contact resolutions and other information. Other embodiments of the disclosed technology generate reports based on aggregated information and/or generate recommendations to address problems with the individual response systems or the overall strategy for responding to customer inquiries.

These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
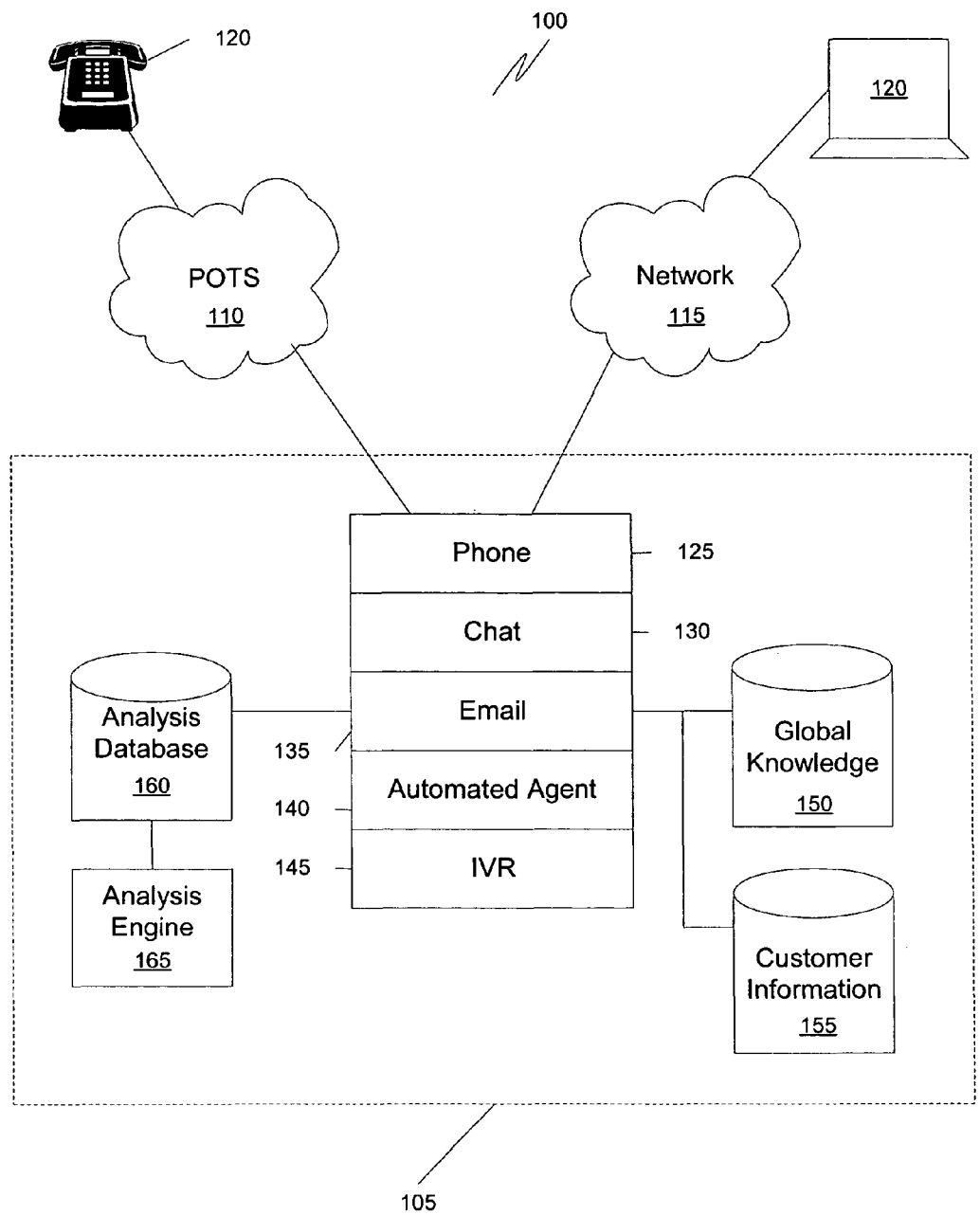
FIG. 1 is a block diagram of a system for responding to and analyzing customer inquiries.

Referring now to the drawings, where like or similar elements are designated with identical reference numerals throughout the several views, and referring in particular to FIG. 1, it illustrates a block diagram of a system 100 for responding to and analyzing customer inquiries. It should be noted, that "customer" can refer to any user or system and is not limited to a party making a commercial transaction. This embodiment of the invention includes a response center 105 coupled to a plain old telephone switch (POTS) 110 and to a network 115 such as the Internet. Through these two networks, customers 120 can communicate with the response center 105.

This version of the response center 105 includes several individual response systems: phone 125, chat 130, email 135, automated agent 140, and interactive voice response (IVR) 145. The response center 105 could also include other systems for communicating with customers or could include fewer response systems than illustrated.

Each response system can retrieve a recommended response to a customer inquiry from the global knowledge database 150, which can include decision trees and/or logic for compiling responses to customer inquiries. The decision trees/logic can be used by all types of response systems. If necessary, a response system can also retrieve customer data from the customer information database 155 or other data from a third party database (not shown) to generate its responses. For example, when the customer 120 sends an email requesting information on how to cancel an order, a live customer agent at the email response center can search the global knowledge database 150 for the proper response. The agent can then include that response, or at least some portion of the response, in the email to the customer 120. If the same request for information originated by phone, the phone agent could pull the same response, or a similar response template, from the global knowledge database 150 and use it as a transcript for talking with the customer 120. Thus, the same customer inquiry can be answered generally in the same way regardless of the customer's method of communicating the inquiry.

Response information included in the global knowledge database 150 can be categorized and/or coded to aid in retrieval and identification of proper responses and in record accumulation. The order cancellation response, for example, could be coded as response number "29." Each of the response systems, regardless of type, can generate an order cancellation response based on response number "29." Further, when any response system generates an order cancellation response, the response system can provide the proper code, "29," to the analysis engine or analysis database 160.

When a response system provides a response to a customer 120, it also stores an indication of the generating response system in the analysis database 160. For example, when the automated agent 140 generates an order cancellation response, it can store a "29" in the analysis database 160 along with an identifier for the automated agent. Other data can also be stored in the analysis database 160, including time stamps, network statistics, user data, etc.

Figure 5:
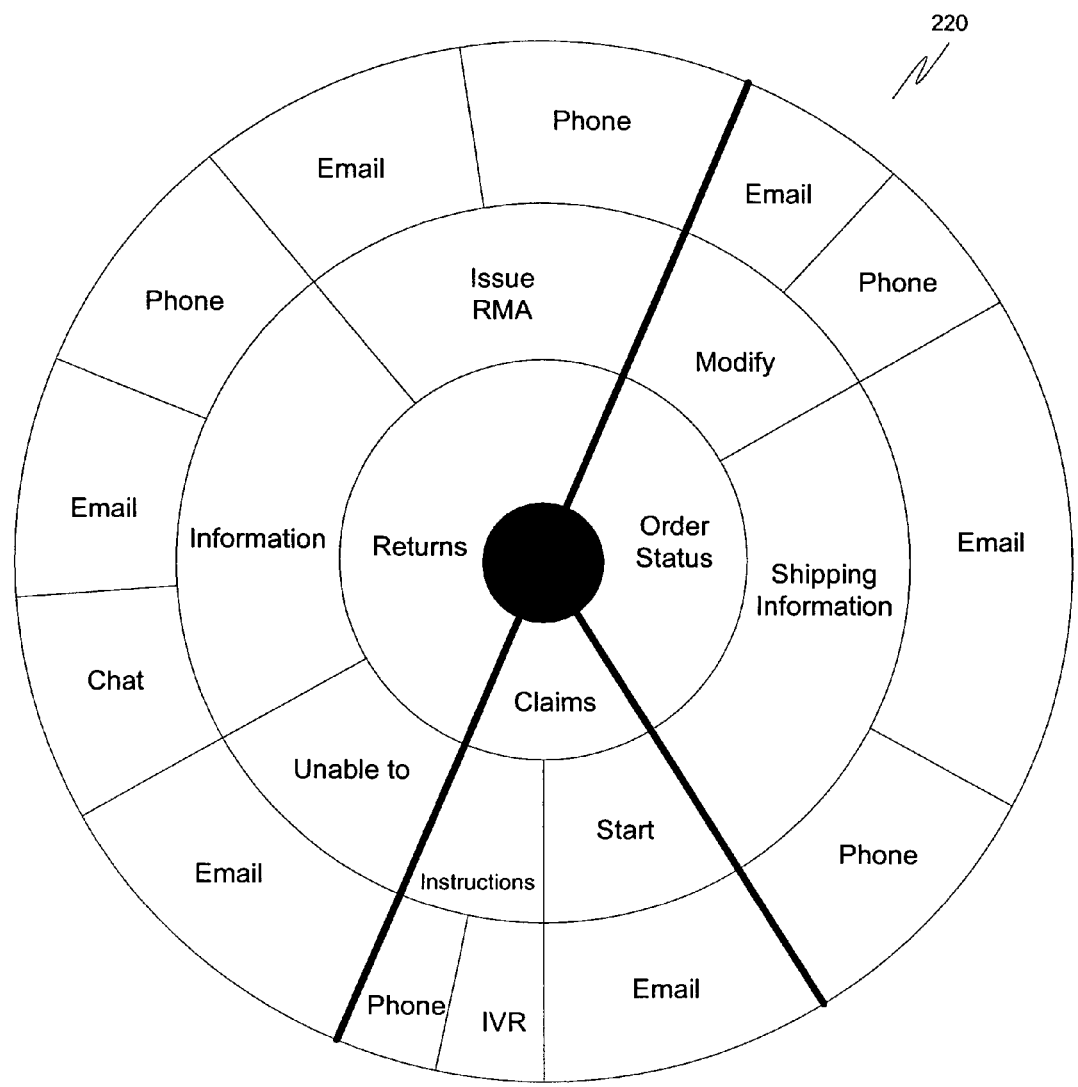
FIG. 5 is a chart illustrating one method for presenting information about customer inquiries.

In one embodiment, the analysis engine 165 can retrieve data from the analysis database 160 and report on the activities of the various response systems. One embodiment of such a report is shown in FIG. 5, which is described in detail below. Typical reports illustrate the number or percentage of responses generated by each individual response system for each response or response category. For example, a report could indicate that two number "29" responses were generated by the response center 105 and that one of those two responses was generated by the automated agent system 140 and the other by the phone response system 125.

Figure 2:
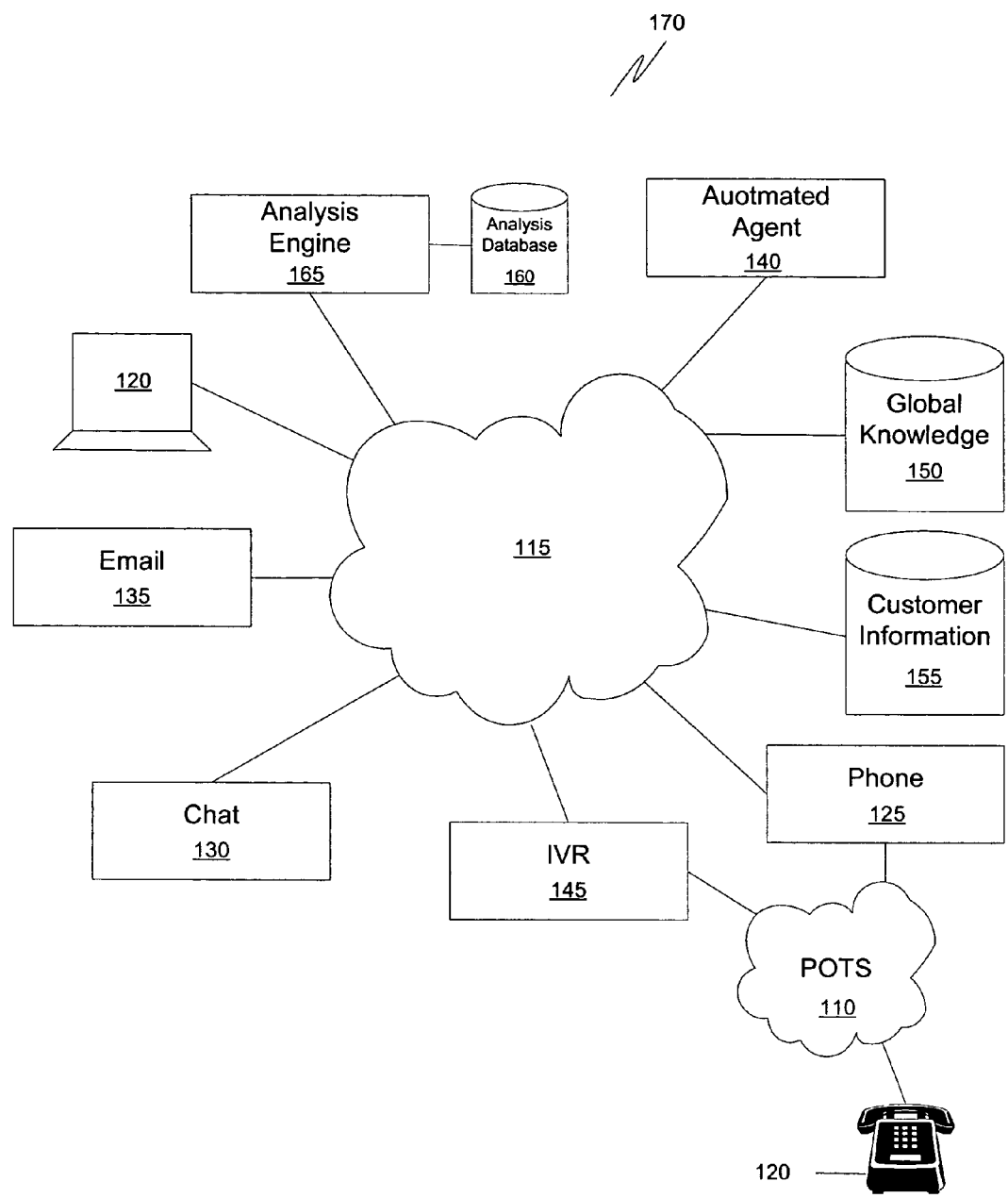
FIG. 2 is a block diagram of another system for responding to and analyzing customer inquiries.

Referring now to FIG. 2, it is a block diagram of another system 170 for responding to and analyzing customer inquiries. This embodiment is similar to the embodiment shown in FIG. 1 except that it includes distributed response systems that are not necessarily integrated. Even if not integrated, each response center can draw its responses or template for responses from the global knowledge database 150 and store indications of generated response and the generating response systems in the analysis database 160.

Figure 3:
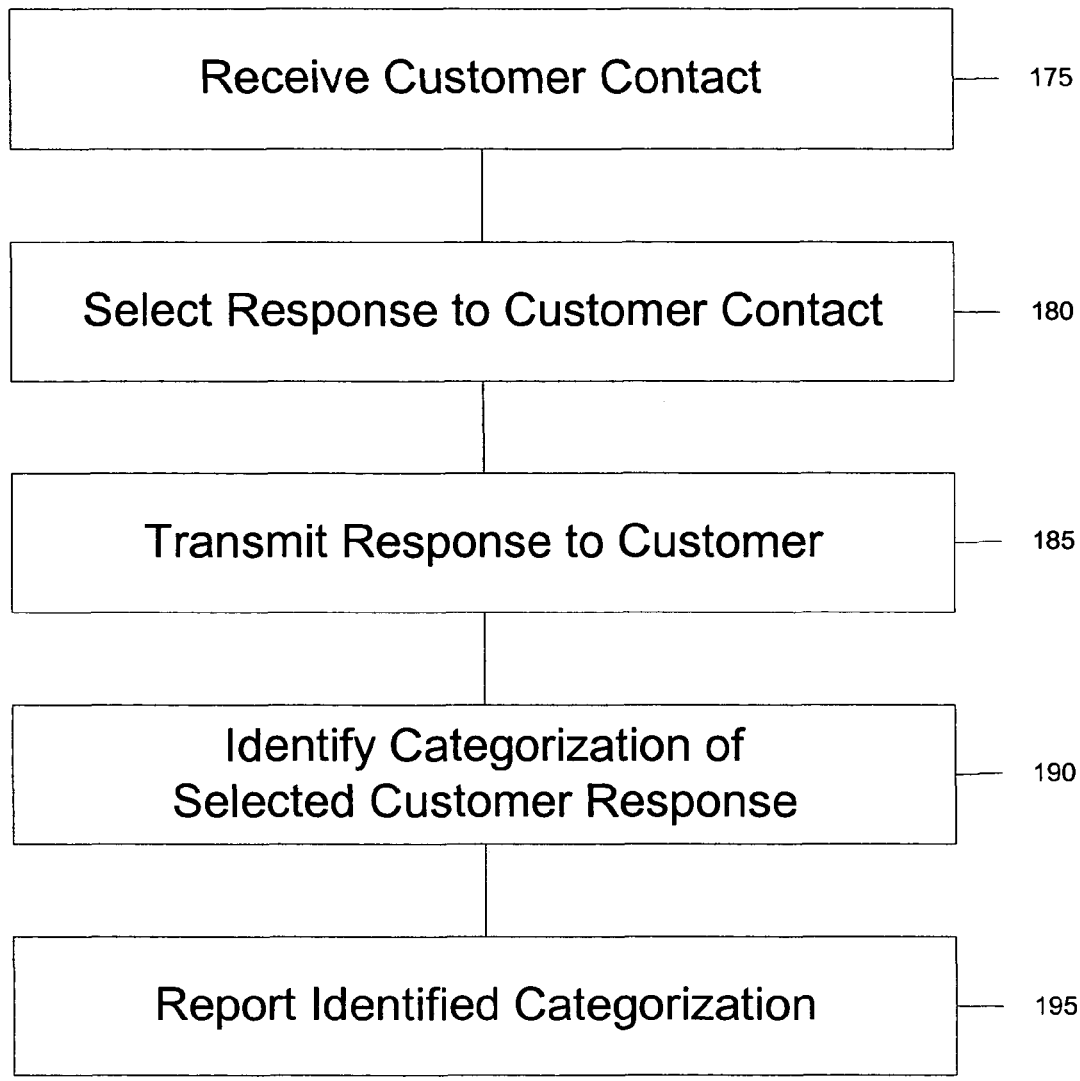
FIG. 3 is a flowchart of one method for collecting customer inquiry information from different response systems.

Referring now to FIG. 3, it is a flowchart of one method for collecting customer inquiry information from different response systems. In this embodiment, a response system initially receives a customer inquiry. (Block 175.) The customer can originate the inquiry through a phone call, an email, a link activation, etc. Once the inquiry has been received, the response system determines the proper response and provides it to the customer. (Blocks 180 and 185.) If the response system is staffed with live agents, the live agents are generally responsible for determining the proper response using, for example, a decision tree or template included in the global knowledge database. If the response system is an automated response system, such as a virtual agent or IVR system, the computer is responsible for using the global knowledge database to respond to the user inquiry. Manual intervention is not generally necessary.

For each response to a customer inquiry, the response identifier is determined and stored in, for example, the analysis database. (Blocks 190 and 195.) An indication of the response system that generated the response can also be stored with the response identifier. In some embodiments, the indication can be as simple as increasing a counter associated with both the response and response system.

Figure 4:
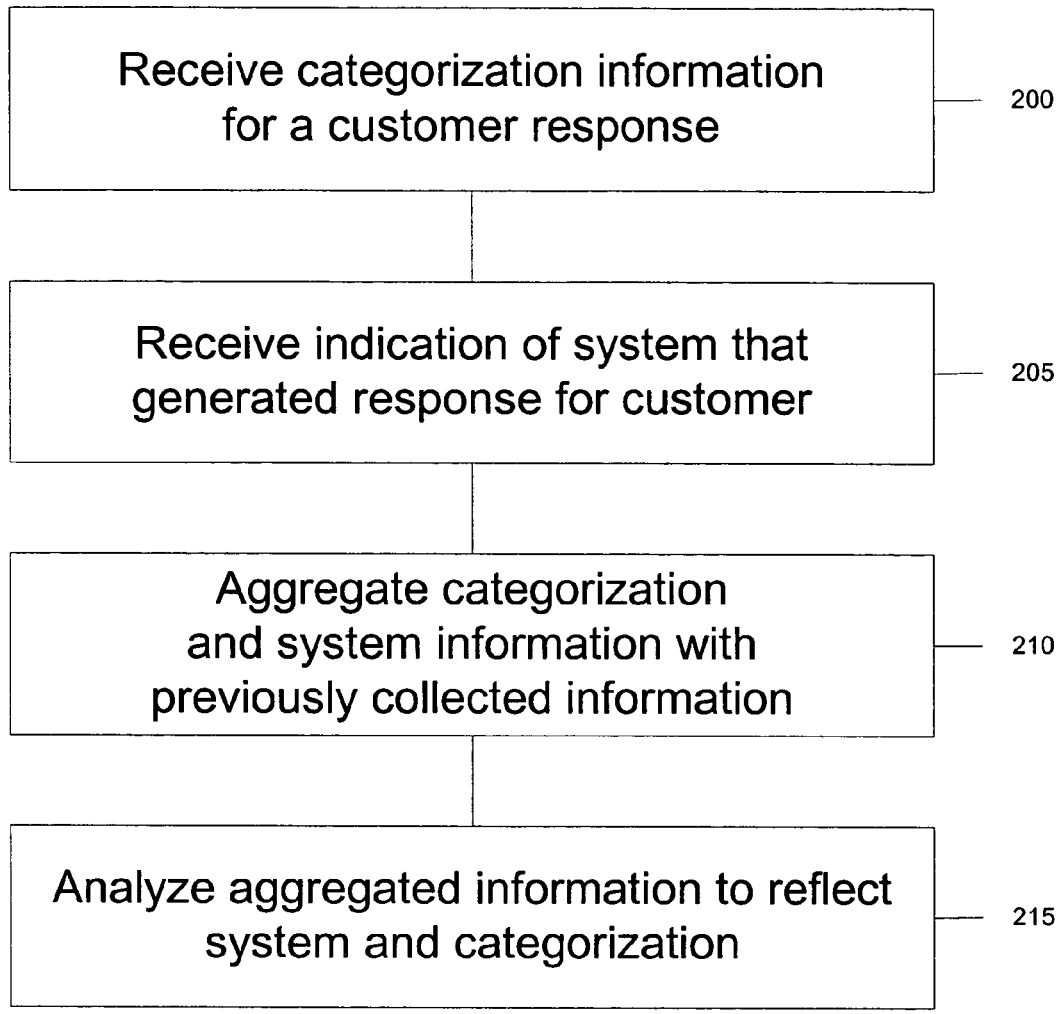
FIG. 4 is a flowchart of one method for analyzing customer inquiry information.

Referring now to FIG. 4, it is a flowchart of one method for analyzing customer inquiry information. As described with relation to FIG. 3, categorization information related to a generated response is received and stored in a database, typically the analysis database. (Blocks 200 and 205.) This information, as previously described, includes both the response identifier and an indication of the response system. Other information related to the response can also be collected. For example, customer identifiers, customer activities, type of customer, time of day, and lapsed time for generating the response can be collected. This information can be aggregated together or used alone to evaluate the performance of a particular response system or the overall response center. (Blocks 210 and 215.) In yet another embodiment, data related to the customer inquiries can be stored and used to evaluate performance.

Referring now to FIG. 5, it is a chart 220 illustrating one method for presenting information about customer inquiries and responses. This chart includes three overlaid pie charts. The inner chart illustrates a broad category of customer responses. The middle chart illustrates a subcategory of the customer responses shown in the inner chart, and the outer chart indicates the response system used to generate the customer responses corresponding to the middle chart. For example, the inner chart includes a category of customer responses entitled "order status." The "order status" category includes two subcategories: "modify" and "shipping information." The outer chart illustrates which response systems generated responses for those subcategories and how many responses were generated by each. For example, this chart illustrates that for the "shipping information" subcategory, the email and phone response systems generated responses and that the email response system generated about twice as many responses as did the phone system.

Using this type of overlaid graph, an analyst can determine what type of issues customers are raising and how those issues are being resolved. In particular, an analyst can determine if particular categories of questions arise often or if a particular category of questions is resolved too often by expensive means such as the phone response system.

Figure 7:
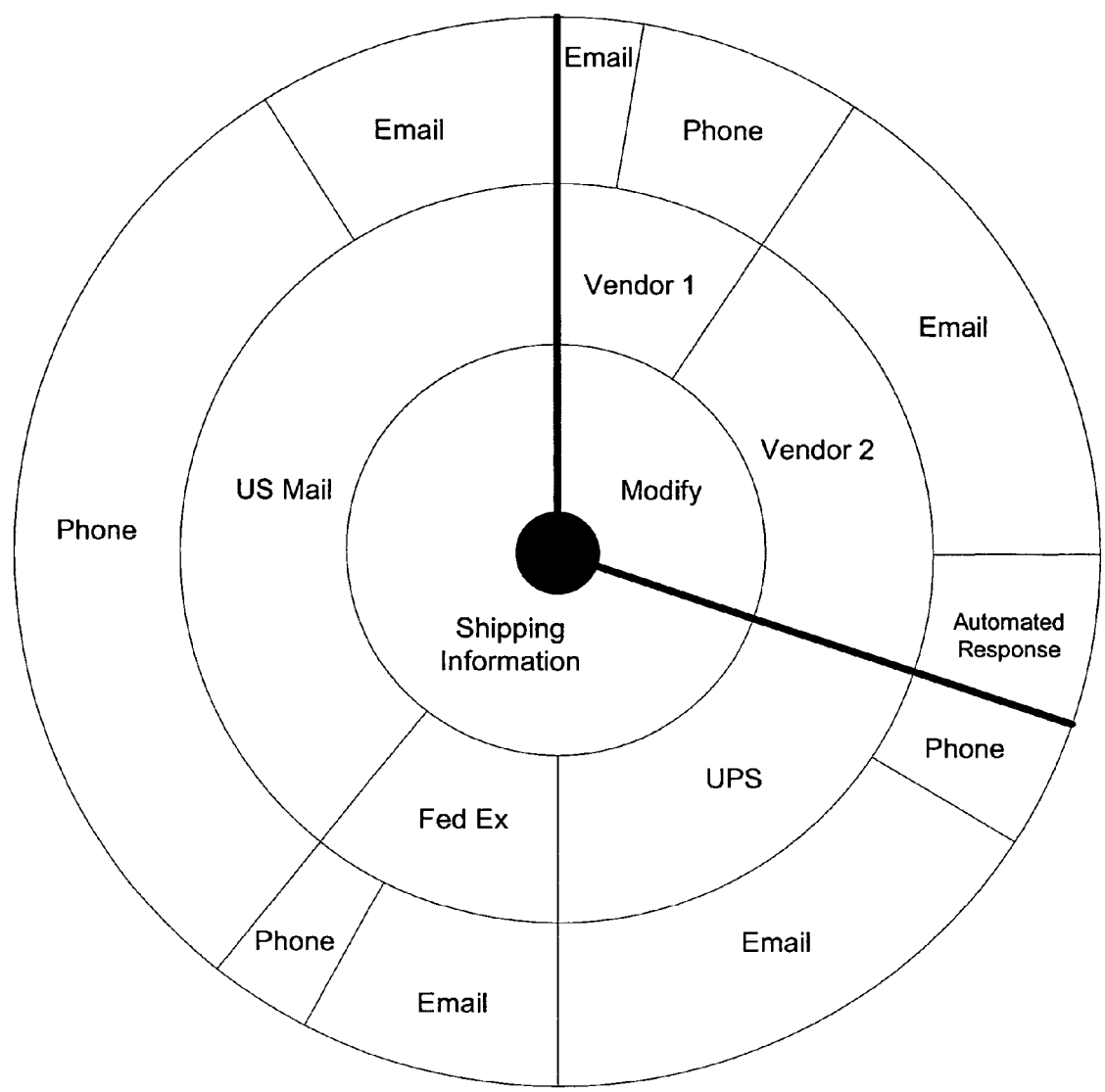
FIG. 7 is another chart illustrating a method for presenting information about customer inquiries.

Each portion of the overlaid graph can link to other graphs or additional information. For example, if an analyst selected the "order status" category in the inner chart, then a new graph could be displayed showing more detail. A typical graph is shown in FIG. 7. Additionally, selecting a category could cause hyperlinks, flat files, costs, images, or tables to be displayed. In other embodiments, the "email" area for a particular subcategory can be linked to additional data such as receipt time, average response time, repeat users, etc.

Figure 6:
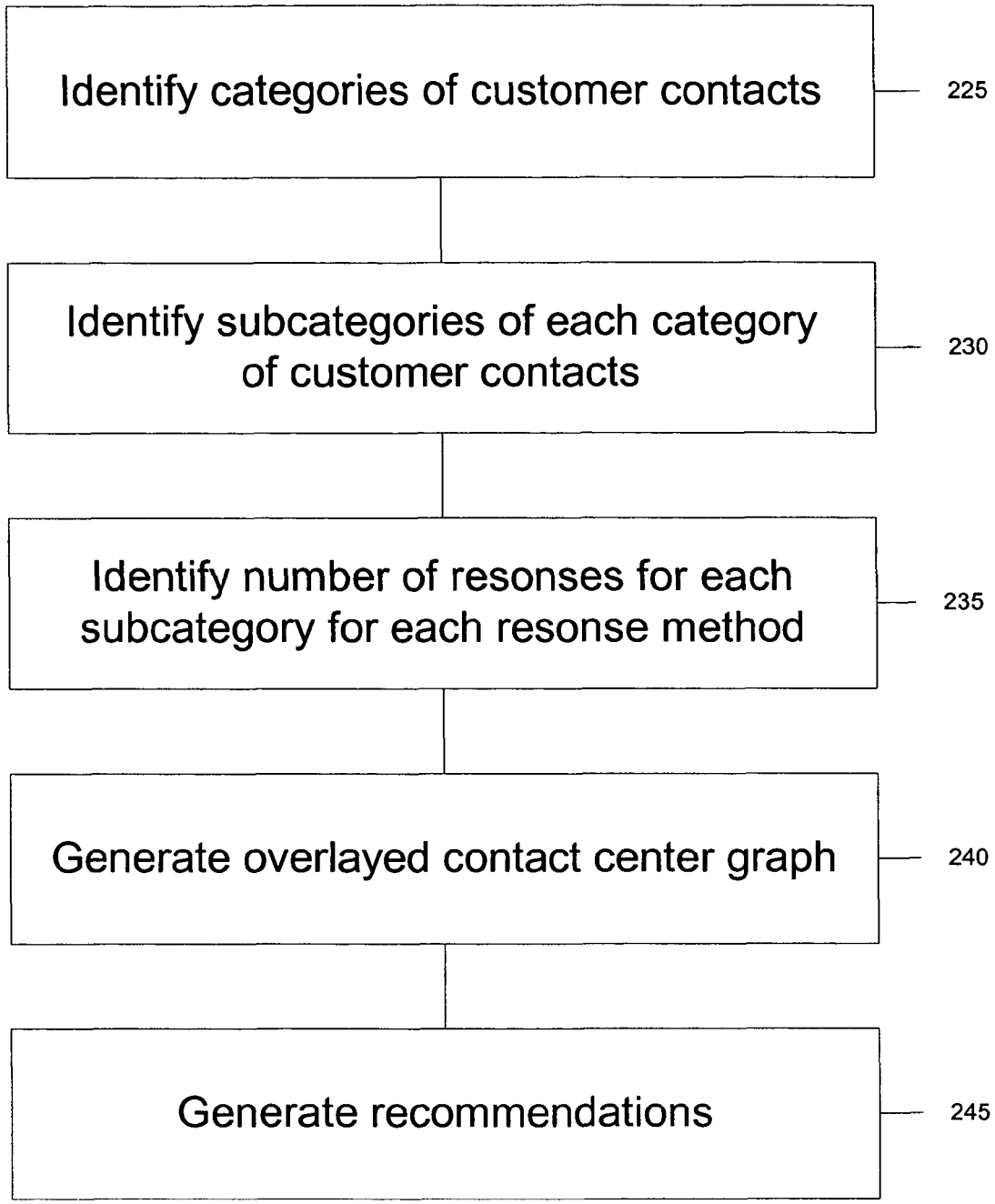
FIG. 6 is a flowchart of one method for generating an overlaid contact center graph.

Referring now to FIG. 6, it is a flowchart of one method for generating an overlaid contact center graph. This method involves identifying categories and subcategories of customer contacts. (Blocks 225 and 230.) In some embodiments, multiple levels of subcategories can be identified and incorporated into the graph. The graphs in FIGS. 5 and 7, however, only show one level. Other levels would be illustrated by additional rings in the graphs.

The analysis engine, or some other logic system, can retrieve information from each response system relating to the number of responses provided for each category and/or subcategory. (Block 235.) For example, the analysis engine can collect all data related to responses in the category "order status," subcategory "modify," and further subcategory "vendor 1." (Shown in FIG. 7.) The analysis engine could also retrieve information relating to which response system, phone or email for example, generated the responses. Using the retrieved data, the analysis engine can generate an overlaid contact center graph. (Block 240.)

The overlaid graph and/or the underlying data can be used to generate recommendations to improve the response center or individual response systems. (Block 245.) Three typical recommendations include: change a business process, enhance the handling of a customer contact, and automate the response to the customer. Notably, one embodiment of the present invention provides an iterative method for improving a response center. For example, if the reports indicate that a particular inquiry is being too often handled by email, the automated agent could be modified to better handle that category of inquiry, hopefully reducing overall costs.

In conclusion, the present invention provides, among other things, a system and method for improving response centers. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A system for processing user inquiries, the system comprising:
   (a) a global knowledge database including a plurality of categorized responses corresponding to a plurality of user inquiries wherein each categorized response comprises at least one identifier;
   (b) a first response system in communication with the global knowledge database, the first response system configured to provide a first categorized response included in the global knowledge database to a first user inquiry, the first response system being of a first type of response system;
   (c) a second response system in communication with the global knowledge database, the second response system configured to provide a second categorized response included in the global knowledge database to a second user inquiry, the second response system being of a second type of response system;
   (d) an analysis database configured to store and analyze first data relating to the categorized responses provided by the first response system and the second response system, and second data relating to the identifiers of the first response and the second response;
   (e) a report generator configured to generate an interactive report using the data stored in the analysis database, wherein the report comprises a plurality of categories, wherein each category corresponds to at least one of: a response system, a categorized response, and an identifier of a categorized response; and
   wherein the report comprises at least one recommendation regarding at least one response system, wherein the recommendation is selected from the group consisting of change a business process, change a specified response system, send this type of transaction to a specified response system, enhance a handling of a customer contact, automate the response to the customer, and do not change the business process.

2. The system of claim 1, wherein the identifiers are selected from the group consisting of response identifiers, system identifiers, customer identifiers, inquiry identifiers, time identifiers, activity identifiers, status identifiers, model identifiers, vendor identifiers, and outcome identifiers.

3. The system of claim 1, wherein the first response system comprises a live-agent response system.

4. The system of claim 1, wherein the second response system comprises an automated response system operable to communicate with the knowledge database independent of the first response system.

5. The system of claim 1, further comprising:
   a user information database configured to store user information;
   wherein the first response system is configured to retrieve information from the user information database in responding to the first user inquiry.

6. The system of claim 1, wherein the first response system and the second response system are distributed.

7. The system of claim 1, wherein the first response system and the second response system are integrated.

8. The system of claim 1, wherein the global knowledge database further comprises a plurality of templates for responding to inquiries from users.

9. The system of claim 8, wherein the first response system is configured to use a first of the plurality of templates to respond to the first user inquiry and wherein the second response system is configured to use the first of the plurality of templates to respond to the second user inquiry.

10. The system of claim 9, wherein the first system comprises a live agent response system and the second response system comprises an automated response system.

11. The system of claim 1, further comprising an analysis engine, wherein the analysis engine is configured to determine the number of times a categorized response is generated by the first response system.

12. The system of claim 1, further comprising an analysis engine, wherein the analysis engine is configured to update the analysis database when a categorized response is generated by the first response system.

13. A system for processing user inquiries, the system comprising:
   (a) a first response system configured to provide a first categorized response to a first user inquiry, wherein the first categorized response comprises at least one identifier, the first response system being a first type of response system;
   (b) a second response system configured to provide a second categorized response to a second user inquiry independent of the first response system, wherein the second categorized response comprises at least one identifier, the second response system being a second type of response system;
   (c) a global knowledge database configured to communicate with the first response system and the second response system, wherein the first categorized response and the second categorized response are both stored in the global knowledge database;
   (d) an analysis database configured to store and analyze data related to the categorized responses, the response systems, and the identifiers; and
   (e) a report generator configured to generate a report based on the data analyzed by the analysis database, wherein the report comprises at least one recommendation regarding at least one response system, wherein the at least one recommendation is selected from the group consisting of change a business process, change a response system, send this type of transaction to a specified response system, enhance a handling of a customer contact, automate the response to the customer, and do not change the business process.

14. The system of claim 13 wherein the second response system comprises an automated response system operable to communicate with the global knowledge database independent of the first response system, and wherein the first response system comprises a live agent response system.

15. The system of claim 13 wherein the selection of a recommendation from the report causes a display of linked additional data.

16. The system of claim 13 wherein the report comprises an overlaid contact graph comprising a plurality of shapes, wherein each shape comprises dimensions corresponding to the data stored in the analysis database.

17. A method for managing user inquiries, the method comprising:
 (a) receiving an inquiry from a user;
 (b) retrieving a categorized response to the user inquiry from a global knowledge database, wherein:
  (i) the global knowledge database includes a plurality of categorized responses;
  (ii) each categorized response from the plurality of categorized responses comprises at least one identifier;
 (c) via a response system, providing the categorized response retrieved from the global knowledge database to the user;
 (d) storing an identifier of the categorized response provided to the user in an analysis database;
 (e) storing an identifier of the response system in the analysis database; and
 (f) generating a report using the identifiers stored in the analysis database;
 wherein the report comprises an overlaid contact graph comprising a plurality of shapes, wherein each shape from the plurality of shapes has at least one dimension corresponding to data stored in the analysis database.

18. The method of claim 17, wherein generating the report comprises generating the overlaid contact graph using a means for generating an overlaid contact graph.

* * * * *